United States Patent
Panzirsch

(10) Patent No.: US 11,625,021 B2
(45) Date of Patent: Apr. 11, 2023

(54) ACTUATOR SYSTEM

(71) Applicant: Deutsches Zentrum für Luft-und Raumfahrt e.V., Cologne (DE)

(72) Inventor: Michael Panzirsch, Asbach-Baeumenheim (DE)

(73) Assignee: Deutsches Zentrum für Luft- und Raumfahrt e.V., Cologne (DE)

( * ) Notice: Subject to any disclaimer, the term of this patent is extended or adjusted under 35 U.S.C. 154(b) by 461 days.

(21) Appl. No.: 16/832,234

(22) Filed: Mar. 27, 2020

(65) Prior Publication Data
US 2020/0310386 A1     Oct. 1, 2020

(30) Foreign Application Priority Data
Mar. 29, 2019   (DE) ..................... 20 2019 001 448.9

(51) Int. Cl.
*G05B 19/416*     (2006.01)

(52) U.S. Cl.
CPC .. *G05B 19/416* (2013.01); *G05B 2219/33274* (2013.01); *G05B 2219/37347* (2013.01); *G05B 2219/49054* (2013.01)

(58) Field of Classification Search
None
See application file for complete search history.

(56) References Cited

U.S. PATENT DOCUMENTS

| | | | |
|---|---|---|---|
| 7,656,388 B2 | 2/2010 | Schena et al. | |
| 8,649,905 B2 | 2/2014 | Ortmaier | |
| 9,308,645 B2 | 4/2016 | Lecours et al. | |
| 9,579,143 B2 | 2/2017 | Ullrich et al. | |
| 2012/0328395 A1* | 12/2012 | Jacobsen | B25J 5/005 414/1 |

FOREIGN PATENT DOCUMENTS

| | | |
|---|---|---|
| DE | 20022244 U1 | 12/2001 |
| DE | 102008041867 B4 | 3/2010 |
| DE | 102013204789 A1 | 9/2013 |
| DE | 102016105682 A1 | 10/2017 |

(Continued)

OTHER PUBLICATIONS

Fjallbrant, "Activity and Stability of Linear Networks", IEEE Transactions on Circuit Theory, 1965, pp. 12-17, vol. 12(1).

(Continued)

*Primary Examiner* — Sean Shechtman
(74) *Attorney, Agent, or Firm* — The Webb Law Firm

(57) ABSTRACT

An actuator system may include a first actuator for being operated by a user, a second actuator for performing a movement of the user, and a transmission channel between the first actuator and the second actuator for transmitting the velocity and the force of the first actuator to the second actuator and vice versa. The actuator system may also include a controller, wherein the controller is configured such that, with the aid of the controller, the energy of the first actuator is adapted to be measured as a desired energy, wherein the transmission channel is configured for transmitting the desired energy to the second actuator and the controller is configured for controlling the damping of the second actuator as a function of the desired energy.

12 Claims, 1 Drawing Sheet

(56) References Cited

FOREIGN PATENT DOCUMENTS

EP  2417925 B1  2/2012
EP  3410260 A2  12/2018

OTHER PUBLICATIONS

Hannaford et al., "Time-Domain Passivity Control of Haptic Interfaces", IEEE Transactions on Robotics and Automation, Feb. 2002, pp. 1-10, vol. 18(1).
Ryu et al., "A passive bilateral control scheme for a teleoperator with time-varying communication delay", Mechatronics: The Science of Intelligent Machines, Oct. 2010, pp. 812-823, vol. 20(7), Elsevier.

* cited by examiner

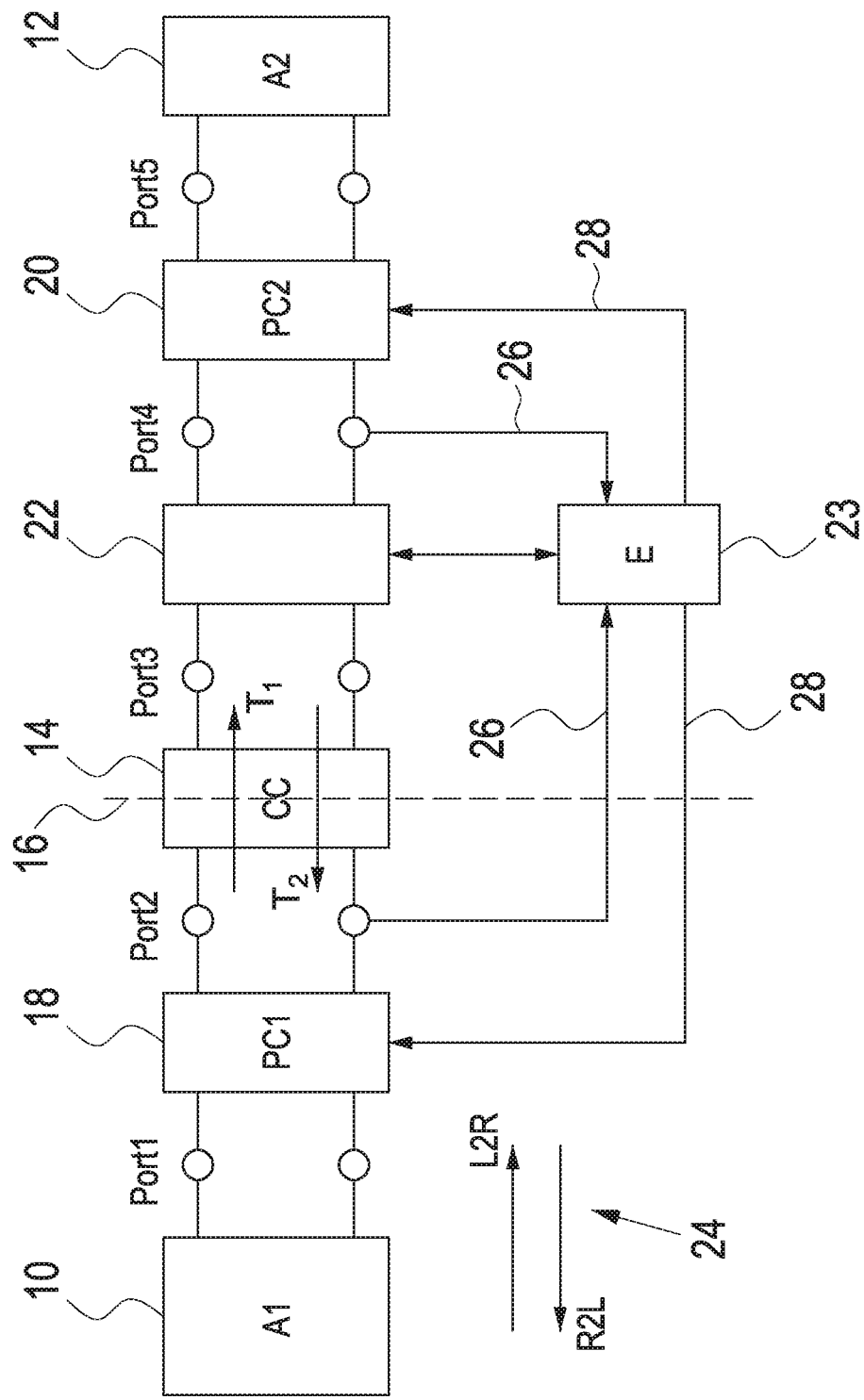

ACTUATOR SYSTEM

CROSS-REFERENCE TO RELATED APPLICATION

This application claims priority to German Utility Model Application No. 20 2019 001 448.9 filed Mar. 29, 2019, the disclosure of which is hereby incorporated by reference in its entirety.

BACKGROUND OF THE INVENTION

Field of the Invention

The invention relates to an actuator system, in particular for teleactuation.

Description of Related Art

Coupled actuated systems include a first actuator connected to a second actuator via a transmission channel. Here, movements of the first actuator are to be transmitted to the second actuator via the transmission channel. The first actuator and the second actuator can be controlled in a master-slave configuration such that a movement applied to the first actuator by an operator, for example, is transmitted, via the transmission channel, to the actuator which performs the movement of the operator. Here the first actuator serves as the master and the second actuator serves as the slave. Such coupled actuators are in particular used in the field of robotics, such as in the field of medical robotics for teleoperations, for example. Thus, it is no longer required that a surgeon is present at the site of operation. Rather, the movements of the surgeon are sensed by the first actuator and are then transmitted, via the transmission channel, to the second actuator which performs the movements of a surgeon for carrying out an operation on a patient.

However, real transmission channels have a certain latency or time lag. This time lag may possibly lead to an instability of the system. Interaction forces must however be precisely transmitted. In this regard, the "Time-domain passivity approach" (TDPA) in B. Hannaford, J.-H. Ryu, Time-domain passivity control of haptic interfaces, Transactions on Robotics and Automation 18 (1) (2002) 1-10" is known in prior art, where the stability or passivity of the actuator system is attained by a dissipation of excess energy.

Besides the transmission of a movement or a force from a first actuator to a second actuator, a force control by a force-feedback system should also be ensured such that a force or a movement is fed back from the second actuator to the first actuator via the transmission channel. Thereby, an adequate system transparency is to be created such that sufficient information on the movement performed by the second actuator can be transmitted to the operator.

For attaining the passivity or stability of the actuator system, conventional approaches, such as the aforementioned TDPA, take into consideration the anisotropy of the energy flow from the first actuator to the second actuator or from the second actuator to the first actuator, and thereby an overcompensation for attaining the passivity is usually effected. This leads to large position errors in the synchronization of the movement of the first actuator with that of the second actuator and vice versa. In addition, the overcompensation makes the actuator system energy-inefficient. At the same time, the compensation leads to force surges which considerably reduce the system transparency (cf. J.-H. Ryu, J. Artigas, C. Preusche, A passive bilateral control scheme for a teleoperator with time-varying communication delay, Mechatronics 20 (7) (2010) 812-823).

For attaining the stability of the system with the states x(t) within the framework of the TDPA, the following must apply:

$$V(x(t)) - V(x(0)) \leq \int_0^t s(u(\tau), y(\tau))d\tau = \int_0^t y^T(\tau)u(\tau)d\tau. \quad (1)$$

As long as the energy increase $(V(x(t))-V(x(0)))$ in the system since T=0 has not become larger than the integral over the energy with the supply rate s and the input variable u as well as the output variable y, the system itself has not generated any energy. In other words, the system is passive when fulfilling the aforementioned condition, such that an absolute stability can be guaranteed (T. Fjallbrant, Activity and stability of linear networks, IEEE Transactions on Circuit Theory 12 (1) (1965) 12-17).

SUMMARY OF THE INVENTION

It is an object of the present invention to provide an energy-efficient and stable actuator system offering a high position accuracy and an improved system transparency.

This object is achieved with the actuator system according to present disclosure.

The actuator system according to the invention, in particular for teleactuation, comprises a first actuator, in particular for being operated by a user. The first actuator can be a master in a master-slave configuration, for example. In addition, according to the invention, the actuator system comprises a second actuator, in particular for performing a movement of the user. Here, the second actuator serves as a slave in the master-slave configuration. Here, the first actuator and the second actuator are connected to each other via a transmission channel for transmitting the velocity and the force of the first actuator to the second actuator. Likewise, within the framework of a force feedback, the velocity and the force of the second actuator are transmitted to the first actuator via the transmission channel, whereby a system transparency is created and the user of the actuator system preferably haptically receives information on the movement of the second actuator. In addition, a controller is provided, wherein the energy of the first actuator is adapted to be measured as a desired energy by the controller. The transmission channel is configured for transmitting the desired energy to the second actuator and for controlling the damping on the side of the second actuator as a function of the transmitted desired energy. Thus, the damping of the second actuator is effected after the measurement of the velocity or the force. In addition, the damping of the controller acts upon the force of the second actuator. The damping ensures the stability of the actuator system, whereby the passivity of the actuator system is always ensured. At the same time, an improved position accuracy is attained.

Preferably, the controller is configured for measuring the energy of the second actuator as the desired energy, wherein this desired energy is transmitted to the first actuator via the transmission channel, in particular within the framework of a force-feedback system. The controller is also configured for controlling the damping of the first actuator as a function of the transmitted desired energy. Thus, the first actuator is damped for ensuring an exact feedback of the forces acting upon the second actuator. This increases the system transparency, wherein it is always ensured that the system remains stable due to the damping.

Preferably, the transmission channel has a time lag. In particular, $T_1$ denotes the transmission time from the first actuator to the second actuator, wherein $T_2$ denotes the transmission time from the second actuator to the first actuator.

Preferably, the transmission channel is an analog or digital data link. In particular, the transmission channel can be a wired or wireless data transmission. For example, the transmission channel can be the internet. Via the transmission channel velocity values and/or force values are transmitted from the first actuator to the second actuator and vice versa.

Preferably, the first actuator and/or the second actuator have one or more than one degree of freedom. This allows for a plurality of degrees of freedom for the movement. In particular, the controller is configured for transmitting the velocity and the force for each one of the degrees of freedom to the respective other actuator via the transmission channel. Alternatively, a separate controller is provided for each degree of freedom.

Preferably, the first actuator and the second actuator are configured such that they have identical degrees of freedom. Preferably, the first actuator and the second actuator are identically designed. Alternatively, the first actuator and the second actuator can be differently designed.

Preferably, the power $P_i$ is obtained at port i (cf. FIG. 1) according to $$P_i(k)=v_i(k)F_i(k)$$

for the sampling step k with the velocity $v_i(k)$ of the actuator and the force $F_i(k)$ of the controller, wherein the energies $E_i$ are calculated as $$E_i^{L2R}(k) = T_s \sum_{j=0}^{k} P_i^{L2R}(j),$$

and $$E_i^{R2L}(k) = T_s \sum_{j=0}^{k} P_i^{R2L}(j),$$

Here, "L2R" denotes the power and the energy from the first actuator to the second actuator ("left to right") and "R2L" denotes the power and the energy from the second actuator to the first actuator ("right to left"). In addition, $T_s$ denotes the sampling time.

Preferably, the force is damped such that in particular $$E_1^{L2R}(k)+E_5^{R2L}(k) \geq E_1^{R2L}(k)+E_5^{L2R}(k)$$

is always fulfilled. Here, $E_1^{L2R}$ denotes the energy transferred from the first actuator to the controller, $E_1^{R2L}$ denotes the energy transferred from the controller to the first actuator, $E_5^{R2L}$ denotes the energy transferred from the second actuator to the controller, and $E_5^{L2R}$ denotes the energy transferred from the controller to the second actuator.

Preferably, the controller comprises an energy monitoring means which is in particular connected to a position controller of the controller and is configured for monitoring the energy flows $E_2^{L2R}(k)$ and $E_4^{R2L}(k)$. Here, $E_2^{R2L}$ denotes the energy transferred from the transmission channel to the damping means of the first actuator. $E_4^{R2L}$ denotes the energy transferred to the damping means of the second actuator behind the energy monitoring means. Here, the energy $E_{St}$ stored in the energy monitoring means is $$E_{St}(k)=E_{St}(k-1)+P_2^{L2R}(k-T_1)T_s+P_4^{R2L}(k)T_s$$

with $T_1$ as the transmission time from the second actuator to the first actuator. In particular, the energy $E_{St}$ stored in the energy monitoring means is the potential energy of the system. Thus, the energy is stored by the energy monitoring means before the damping of the force of the second actuator. Thereby, a particular energy-efficient system is created.

Preferably the energy $W^{PC1}$ dissipated due to the damping is $$W^{PC1}(k) = \sum_{j=0}^{k-T_2} P^{R2L,des}(j)T_s - \sum_{j=0}^{k} P_2^{R2L}(j)T_s - W_{diss}^{PC1}(k-1)$$

with $T_2$ as the transmission time from the second actuator to the first actuator via the transmission channel. Here, $P^{R2L,des}(k)$ is $$P^{R2L,des}(k)=P_3^{R2L}(k)+P_{exc}^{R2L}(k).$$

Here, $P_3^{R2L}$ denotes the power adapted to be sensed by the energy monitoring means as an input power into the transmission channel towards the first actuator. In addition, $P_{exc}^{R2L}(k)$ is $$P_{exc}^{R2L}(k) = \begin{cases} P_{exc}(k)\frac{P_3^{R2L}(k)}{P_{out}^{act}(k)}, & \text{if } E_{St}(k) < P_{out}^{act}(k)T_s \\ 0, & \text{if } E_{St}(k) > P_{out}^{act}(k)T_s \end{cases}$$

with $$P_{exc}(k)=E_{St}(k)/T_s-P_{out}^{act}(k)$$

and $$P_{out}^{act}(k)=P_3^{R2L}(k)+P_4^{L2R}(k),$$

wherein $P_4^{L2R}(k)$ denotes the power transmitted from the controller to the second actuator.

Preferably, the energy $W^{PC2}$ at the second actuator dissipated due to the damping is $$W^{PC2}(k) = \sum_{j=0}^{k} (P^{L2R,des}(j) - P_4^{L2R}(j))T_s - W_{diss}^{PC2}(k-1).$$

with $$P^{L2R,des}(k)=P_4^{L2R}(k)+P_{exc}^{L2R}(k),$$

wherein $P_4^{L2R}(k)$ denotes the power transmitted from the energy monitoring means to the second actuator, and $P_{exc}^{L2R}(k)$ is $$P_{exc}^{L2R}(k) = \begin{cases} P_{exc}(k)\frac{P_4^{L2R}(k)}{P_{out}^{act}(k)}, & \text{if } E_{St}(k) < P_{out}^{act}(k)T_s \\ 0, & \text{if } E_{St}(k) > P_{out}^{act}(k)T_s \end{cases},$$

with $$P_{exc}(k)=E_{St}(k)/T_s-P_{out}^{act}(k)$$

and $$P_{out}^{act}(k)=P_3^{R2L}(k)+P_4^{L2R}(k).$$

Here, $P_3^{R2L}$ denotes the power adapted to be sensed by the energy monitoring means as the input power into the transmission channel towards the first actuator.

Preferably, the actuator system is arranged in the following order: first actuator, passivity controller or damping means of the first actuator, transmission channel, energy monitoring means, passivity controller or damping means of the second actuator. Thus, a passivity controller is directly connected to the first actuator. Likewise, a passivity controller is directly connected to the second actuator. In addition, in the case of a transmission path from the first actuator to the second actuator the energy monitoring means is arranged behind the transmission channel, in particular at the site of the second actuator.

Hereinafter the invention is explained in detail on the basis of a preferred embodiment with reference to the accompanying drawings.

BRIEF DESCRIPTION OF THE DRAWINGS

FIG. 1 shows a schematic diagram of the actuator system in the form of a 2-port network.

DESCRIPTION OF THE INVENTION

The actuator system according to the invention comprises a first actuator 10 as well as a second actuator 12. The first actuator 10 and the second actuator 12 are connected to each other via a transmission channel 14. The transmission channel 14 has a time lag indicated by the dashed line 16. Thus, $T_1$ is the transmission time from the first actuator to the second actuator and $T_2$ is the transmission time from the second actuator to the first actuator. In particular, $T_1$ and $T_2$ can be the same but can also differ from each other. The transmission channel 14 can be a wired data link or a wireless data link. In particular, the transmission from the first actuator 10 to the second actuator 12 and vice versa can be carried out via the internet or another communication link.

A movement of the first actuator (A1) 10 applied by a user to the first actuator 10, for example, is transmitted to the second actuator (A2) 12 via the transmission channel (CC) 14, the second actuator being intended for performing the same movement with the same force and velocity and a high position accuracy. In particular, the first actuator 10 and the second actuator 12 can be provided in a master-slave configuration. However, forces and movement acting on the second actuator 12 are also to be transmitted to the first actuator 10 via the transmission channel 14, in particular within the framework of a force-feedback system. Thereby, a high system transparency is created such that a user connected with the first actuator experiences forces acting on the second actuator 12, for example as a haptic feedback, a visual feedback or the like.

The time lag 16 of the transmission channel 14 could make the actuator system instable. For ensuring the stability or passivity of the actuator system, a controller is provided. The controller comprises a first passivity controller (PC) 18 which damps the first actuator 10. In addition, a second passivity controller (PC) 20 is provided which damps the second actuator 12. In addition, a position controller 22 is provided which controls a position coupling between the first actuator and the second actuator. The position controller 22 has connected thereto an energy monitoring means 23 for monitoring the energies. The energy monitoring means (E) 23 comprises an energy storage. In the FIGURE, the energy monitoring means 23 is configured as a separate element. However, the energy monitoring means 23 can be an integral part of the position controller 22.

By the controller and in particular the energy monitoring means 23 the power is obtained as $$P_i(k) = v_i(k) F_i(k)$$

for the sampling step k with the velocity $v_i(k)$ of the actuator and the force $F_i(k)$ of the controller. Thereby, the energies $E_i$ are obtained as $$E_i^{L2R}(k) = T_s \sum_{j=0}^{k} P_{i|}^{L2R}(j),$$

and $$E_i^{R2L}(k) = T_s \sum_{j=0}^{k} P_i^{R2L}(j),$$

Here, "L2R" denotes the power $P_i$ or the energy $E_i$ from the first actuator towards the second actuator, and "R2L" denotes the power with the energy of the second actuator to the first actuator according to arrows 24. $T_s$ denotes the sampling time. i denotes the respective port between the individual elements of the actuator system such that i=1, . . . , 5.

Here, the force of the first actuator 10 and the second actuator 12 is damped by the passivity controllers 18, 20 such that $$E_1^{L2R}(k) + E_5^{R2L}(k) \geq E_1^{R2L}(k) + E_5^{L2R}(k).$$

is always fulfilled. Thereby, the stability of the actuator system is guaranteed.

In the energy storage of the energy monitoring means 23 the energy $$E_{St}(k) = E_{St}(k-1) + P_2^{L2R}(k-T_1) T_s + P_4^{R2L}(k) T_s$$

is stored, with $T_1$ as the transmission time from the first actuator to the second actuator. The stored energy $E_{St}$ is a potential energy of the system. The stored energy thus results from the stored energy of the previous sampling step of the power at port 2 which is transmitted from the first actuator 10 to the second actuator 12 as well as the power at port 4 which is transmitted from the second actuator 12 to the first actuator 10. This is indicated by arrows 26 in the FIGURE.

The force of the first actuator 10 and the second actuator 12 is then damped by the passivity controllers (PC) 18, 20. The energy to be dissipated by the passivity controller 18 is $$W^{PC1}(k) = \sum_{j=0}^{k-T_2} P^{R2L,des}(j) T_s - \sum_{j=0}^{k} P_2^{R2L}(j) T_s - W_{diss}^{PC1}(k-1)$$

with $T_2$ as the transmission time from the second actuator 12 to the first actuator 10 via the transmission channel 14. This results in $P^{R2L,des}(k)$ as $$P^{R2L,des}(k) = P_3^{R2L}(k) + P_{exc}^{R2L}(k)$$

with $P_3^{R2L}$ as the power at port 3 transmitted from the second actuator 12 to the first actuator 10 and thus denotes the power adapted to be sensed by the energy monitoring means 23 as the input power into transmission channel 14 towards the first actuator 10. $P_{exc}^{L2R}(k)$ is dependent on the energy stored in the energy storage and is $$P_{exc}^{R2L}(k) = \begin{cases} P_{exc}(k)\frac{P_3^{R2L}(k)}{P_{out}^{act}(k)}, & \text{if } E_{St}(k) < P_{out}^{act}(k)T_s \\ 0, & \text{if } E_{St}(k) > P_{out}^{act}(k)T_s \end{cases}$$

with $$P_{exc}(k) = E_{St}(k)/T_s - P_{out}^{act}(k)$$

and $$P_{out}^{act}(k) = P_3^{R2L}(k) + P_4^{L2R}(k).$$

This results in the energy to be dissipated by the passivity controller 18 as a function of the energy stored in the energy storage. Here, merely the force is reduced. In addition, in any case, the force is reduced after the measurement of the transmitted energy so that energy is always only dissipated to such an amount that the stability of the actuator system is ensured. Thereby, an energy-efficient system is ensured.

Analogously, the energy to be dissipated by the second passivity controller 20 is $$W^{PC2}(k) = \sum_{j=0}^{k}(P^{L2R,des}(j) - P_4^{L2R}(j))T_s - W_{diss}^{PC2}(k-1).$$

with $$P^{L2R,des}(k) = P_4^{L2R}(k) + P_{exc}^{L2R}(k),$$

wherein $P_4^{L2R}(k)$ denotes the power transmitted from the energy monitoring means 23 to the second actuator and $P_{exc}^{L2R}(k)$ is $$P_{exc}^{L2R}(k) = \begin{cases} P_{exc}(k)\frac{P_4^{L2R}(k)}{P_{out}^{act}(k)}, & \text{if } E_{St}(k) < P_{out}^{act}(k)T_s \\ 0, & \text{if } E_{St}(k) > P_{out}^{act}(k)T_s \end{cases},$$

with $$P_{exc}(k) = E_{St}(k)/T_s - P_{out}^{act}(k)$$

and $$P_{out}^{act}(k) = P_3^{R2L}(k) + P_4^{L2R}(k).$$

Thus, a new actuator system is created which is always stable and where the passivity controllers 18, 20 are controlled such that merely a required energy dissipation or reduction of the force is carried out. Thereby, the system becomes energy-efficient. At the same time, only minor corrections for attaining the passivity are required such that the user connected with the first actuator experiences no or merely small force surges within the framework of the force-feedback system, whereby the system transparency is increased. This is attained by the damping of the passivity controllers 18, 20 merely acting upon the force of the first actuator or the second actuator 12. This is also attained by performing the damping only after the measurement of the relevant energies, whereby, as described above, merely such energy is dissipated which would lead to an instability of the system.

The embodiments illustrated herein are mere examples of the present invention and should therefore not be construed as being limiting. Alternatives provided by a skilled person in consideration of the embodiments are likewise encompassed by the scope of protection of the present invention. Accordingly, the foregoing description is intended to be illustrative rather than restrictive. The invention described hereinabove is defined by the appended claims and all changes to the invention that fall within the meaning and range of equivalency of the claims are to be embraced within their scope.

The invention claimed is:

1. An actuator system comprising
    a first actuator for being operated by a user,
    a second actuator for performing a movement of the user,
    a transmission channel between the first actuator and the second actuator for transmitting a velocity and a force of the first actuator to the second actuator and vice versa, and
    a controller, wherein the controller is configured such that, with the aid of the controller, the energy of the first actuator is adapted to be measured as a desired energy, wherein the transmission channel is configured for transmitting the desired energy to the second actuator, and the controller is configured for controlling a damping of the second actuator as a function of the desired energy, wherein power $P_i$ is obtained according to $P_i(k) = v_i(k)F_i(k)$, for a sampling step k with a velocity $v_i(k)$ of the actuator and a force $F_i(k)$ of the controller, wherein energies $E_i$ are calculated as $$E_i^{L2R}(k) = T_s\sum_{j=0}^{k} P_i^{L2R}(j),$$

and $$E_i^{R2L}(k) = T_s\sum_{j=0}^{k} P_i^{R2L}(j),$$

wherein L2R denotes a power and an energy from the first actuator to the second actuator, R2L denotes a power and an energy from the second actuator to the first actuator and $T_s$ denotes a sampling time.

2. The actuator system according to claim 1, wherein the controller is configured such that, with the aid of the controller, the energy of the second actuator is adapted to be measured as a desired energy, the desired energy is transmitted to the first actuator via the transmission channel, and the controller is configured for controlling a damping of the first actuator as a function of the transmitted desired energy.

3. The actuator system according to claim 1, wherein the transmission channel has a time lag.

4. The actuator system according to claim 1, wherein the transmission channel is a data link.

5. The actuator system according to claim 1, wherein the first actuator or the second actuator have one or more than one degree of freedom, wherein the velocity and the force for each of the degrees of freedom are transmitted to the respective other actuator via the transmission channel.

6. The actuator system according to claim 1, wherein the first actuator and the second actuator have identical degrees of freedom.

7. The actuator system according to claim 1, wherein the force is damped such that $$E_1^{L2R}(k) + E_5^{R2L}(k) \geq E_1^{R2L}(k) + E_5^{L2R}(k)$$

is always fulfilled.

8. The actuator system according to claim 1, wherein the controller comprises an energy monitoring means which monitors energy flows of $E_2^{L2R}(k)$ and $E_4^{R2L}(k)$, wherein an energy $E_{St}$ stored in the energy monitoring means is $$E_{St}(k)=E_{St}(k-1)+P_2^{L2R}(k-T_1)T_s+P_4^{R2L}(k)T_s$$

wherein $T_1$ denotes a transmission time from the first actuator to the second actuator via the transmission channel.

9. The actuator system according to claim 8, wherein, due to the damping, energy $W^{PC1}$ is dissipated, wherein the energy $W^{PC1}$ to be dissipated is $$W^{PC1}(k) = \sum_{j=0}^{k-T_2} P^{R2L,des}(j)T_s - \sum_{j=0}^{k} P_2^{R2L}(j)T_s - W_{diss}^{PC1}(k-1)$$

with $T_2$ as a transmission time from the second actuator to the first actuator via the transmission channel, wherein $P^{R2L,des}(k)$ is $$P^{R2L,des}(k)=P_3^{R2L}(k)+P_{exc}^{R2L}(k),$$

with $P_3^{R2L}$ as a power adapted to be sensed by the energy monitoring means as an input power into the transmission channel towards the first actuator and $P_{exc}^{R2L}(k)$ is $$P_{exc}^{R2L}(k) = \begin{cases} P_{exc}(k)\dfrac{P_3^{R2L}(k)}{P_{out}^{act}(k)}, & \text{if } E_{St}(k) < P_{out}^{act}(k)T_s \\ 0, & \text{if } E_{St}(k) > P_{out}^{act}(k)T_s \end{cases}$$

with $$P_{exc}(k)=E_{St}(k)/T_s-P_{out}^{act}(k)$$

and $$P_{out}^{act}(k)=P_3^{R2L}(k)+P_4^{L2R}(k),$$

wherein $P_4^{L2R}(k)$ denotes a power transmitted by the energy monitoring means to the second actuator.

10. The actuator system according to claim 8, wherein due to the damping, energy $W^{PC2}$ is dissipated, wherein the dissipated energy $W^{PC2}$ is $$W^{PC2}(k) = \sum_{j=0}^{k} (P^{L2R,des}(j) - P_4^{L2R}(j))T_s - W_{diss}^{PC2}(k-1).$$

with $$P^{L2R,des}(k)=P_4^{L2R}(k)+P_{exc}^{L2R}(k),$$

wherein $P_4^{L2R}(k)$ denotes a power transmitted by the energy monitoring means to the second actuator and $P_{exc}^{L2R}(k)$ is $$P_{exc}^{L2R}(k) = \begin{cases} P_{exc}(k)\dfrac{P_4^{L2R}(k)}{P_{out}^{act}(k)}, & \text{if } E_{St}(k) < P_{out}^{act}(k)T_s \\ 0, & \text{if } E_{St}(k) > P_{out}^{act}(k)T_s \end{cases},$$

with $$P_{exc}(k)=E_{St}(k)/T_s-P_{out}^{act}(k)$$

and $$P_{out}^{act}(k)=P_3^{R2L}(k)+P_4^{L2R}(k),$$

wherein $P_3^{R2L}$ denotes a power adapted to be sensed by the energy monitoring means as the input power into the transmission channel towards the first actuator.

11. The actuator system according to claim 4, wherein the data link is the internet.

12. The actuator system according to claim 6, wherein the identical degrees of freedom of the first actuator and the second actuator are identically designed.

\* \* \* \* \*